June 13, 1933.    A. A. HODGKINS    1,914,255
SHIFT ROD CONTROLLING DEVICE
Filed March 21, 1931    2 Sheets-Sheet 1
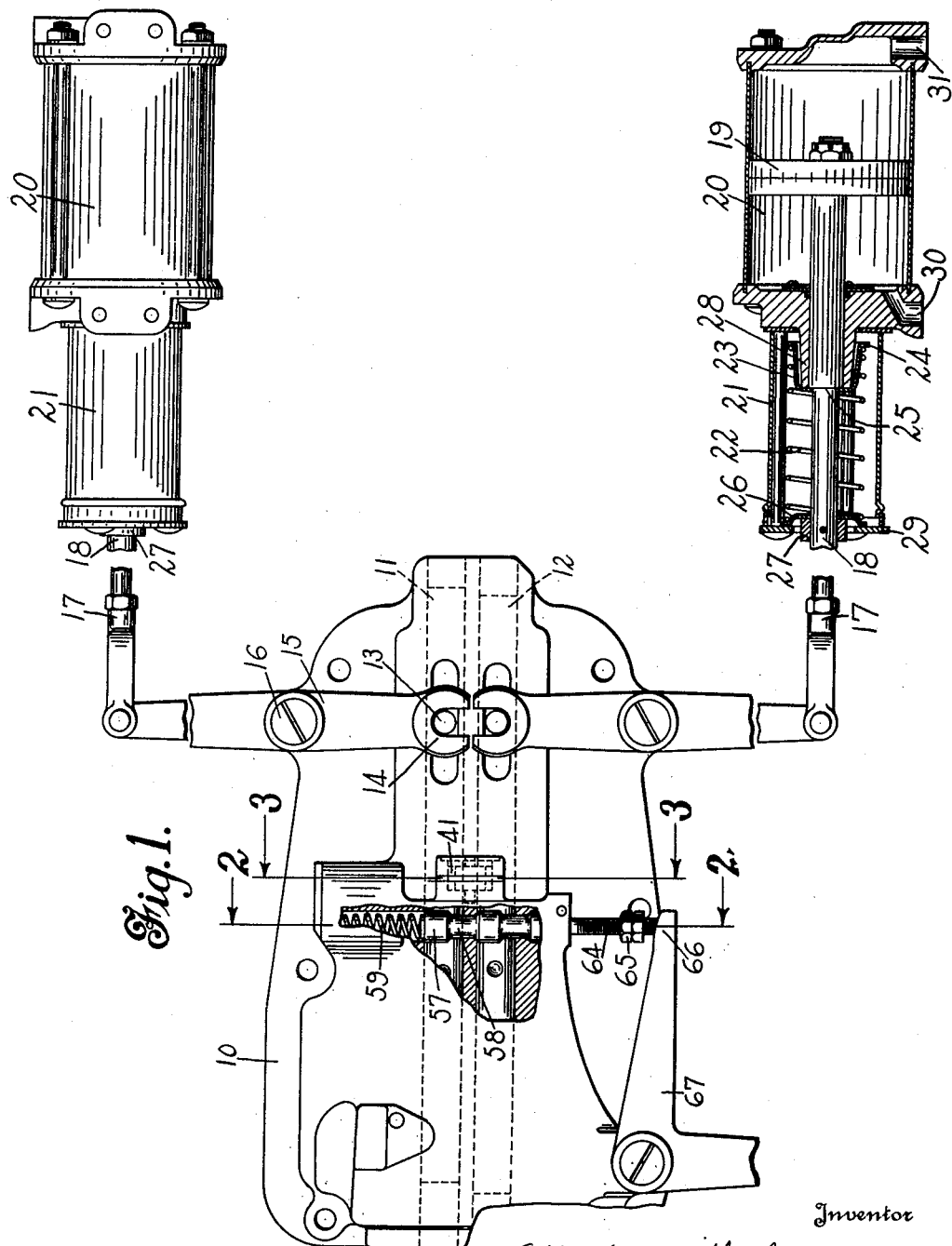
Inventor
Albert A. Hodgkins
By Rockwell & Bartholow
Attorneys June 13, 1933.  A. A. HODGKINS  1,914,255
SHIFT ROD CONTROLLING DEVICE
Filed March 21, 1931   2 Sheets-Sheet 2
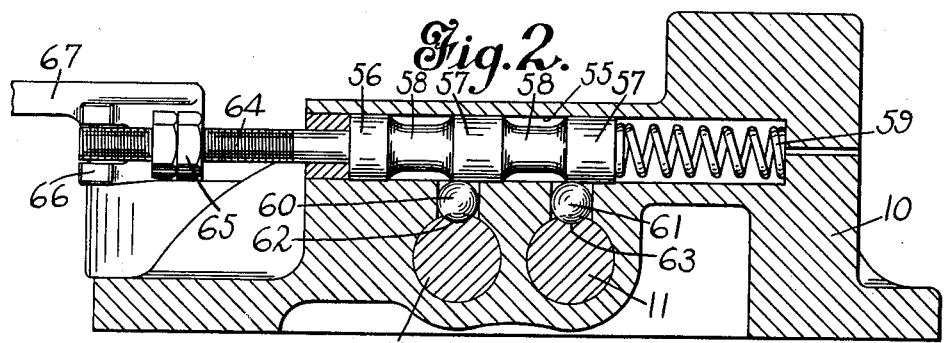
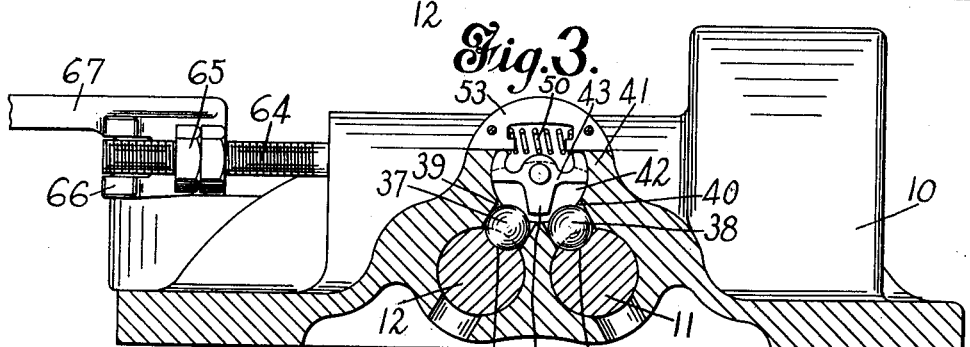
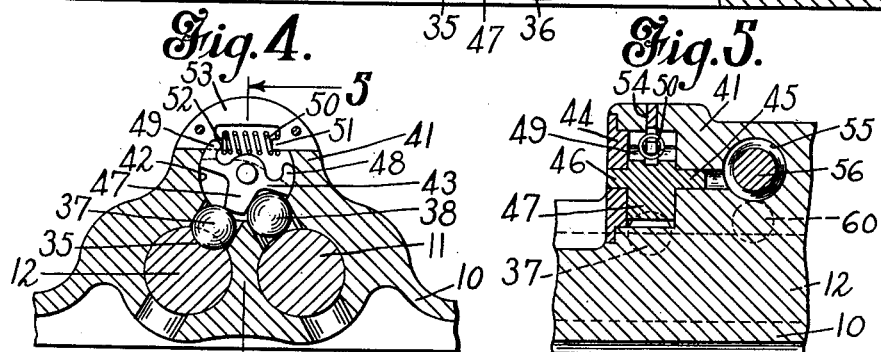
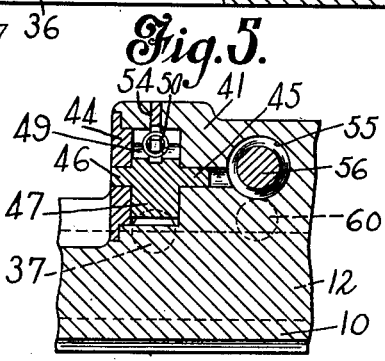
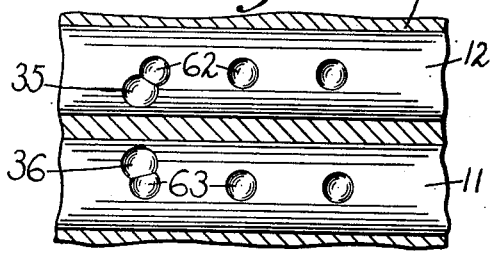
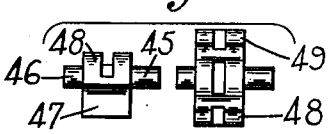
Inventor
Albert A. Hodgkins
By Rockwell & Batchelor
Attorneys Patented June 13, 1933

1,914,255

UNITED STATES PATENT OFFICE

ALBERT A. HODGKINS, OF LEONIA, NEW JERSEY, ASSIGNOR TO UNIVERSAL GEAR SHIFT CORPORATION, OF NEW HAVEN, CONNECTICUT, A CORPORATION OF DELAWARE

SHIFT ROD CONTROLLING DEVICE

Application filed March 21, 1931. Serial No. 524,404.

This invention relates to the control of slip rods or shifter rods and more particularly to power operated or mechanically operated slip rods as distinguished from those operated manually.

In devices wherein certain of the parts are operated by two or more sliding rods, it is often necessary or advantageous to so control these rods that, while any one thereof may be freely moved, when all are in a given or neutral position, nevertheless when one has been moved from that position, it will be impossible to move the others until the first has been returned to its original position. This is true, for example, in the case of slip rods or shifter rods for automobile transmission gears, particularly when such rods are power operated.

Such an arrangement has been provided by mounting a detent between the rods so that when one is moved the detent will be caused to engage in a groove in the other and maintain it in a given or, for example, neutral position. One disadvantage in such an arrangement, however, is that, when one of the rods is shifted, the detent will be moved toward the other, and, therefore, when power is applied to one to tend to shift it, the detent will be urged toward the other rod and bind frictionally against it, and will, therefore, offer opposition to the return of that rod to its original position.

One object of the present invention is to provide a control for slip rods of such a character that, when one of the rods is shifted from a given or neutral position, the other will be held in neutral position in such a manner that no opposition will be offered to the return of the first rod notwithstanding the fact that power may be applied to move the second rod prior to the return of the first.

Another object of this invention is to provide a new and improved control means for slip rods to hold one of such rods in neutral position when another has been moved from such position, and until the return of the latter.

Another object of the invention is to provide a control means for slip rods such that any one thereof may be freely moved from a given position, but another rod will be retained against movement when the first has been so moved, and until it has been returned to its original position, without offering any opposition to such return.

More specifically the invention resides in the provision of a control mechanism for shifter rods such that, when one of the rods is moved from a given position, a detent will be caused to engage the other rod and hold it from movement in such a manner that the holding means will react against some part of the mechanism other than the rod which has been moved, so that no force will be exerted to oppose the return of this rod to its original position.

To these and other ends the invention consists in the novel features and combinations of parts to be hereinafter described and claimed.

In the accompanying drawings:

Fig. 1 is a top plan view of a mechanism embodying my invention;

Fig. 2 is a sectional view on line 2—2 of Fig. 1;

Fig. 3 is a sectional view on line 3—3 of Fig. 1;

Fig. 4 is a sectional view of the slip rod controlling means in the position assumed when one of the rods has been moved from its original position;

Fig. 5 is a sectional view on line 5—5 of Fig. 4;

Fig. 6 is a top plan view of a portion of the slip rods, and

Fig. 7 is a composite view showing the rocker in side and top views.

For purposes of convenience in illustrating a preferred embodiment of my invention, I have shown it as applied to slip rods or shifter rods for automobile transmission gears, although it will be understood that the invention is not limited to this use, but is applicable to slip rods or shifter rods used in other relations.

In Fig. 1 of the drawings I have shown at 10 the cover plate of a transmission housing, the cover plate having mounted therein slip or shifter rods 11 and 12. These rods may be operated by any mechanical means, but, as shown, each is provided with an upstanding pin 13 received in the yoke 14 of a lever 15 pivotally mounted on the housing at 16. To the outer end of each of these levers is pivoted a rod 17 connected to the piston rod 18 of a piston 19 mounted in a cylinder 20.

Adjacent one end of the cylinder 20 is a spring housing 21 having housed therein a coil spring 22, the piston rod 18 extending through this spring housing within the coils of the spring. A thimble 23 is loosely carried by the piston and is provided with a flange 24 at its base, which bears against one end of the spring 22. The piston rod 18 is provided with a shoulder 25 which will pick up the thimble 23 when the piston is moved to the left, as shown in Fig. 1, to compress the spring. Likewise at the other end of the spring housing 21 there is provided a plate 26 which, when the piston is moved to the right, will be picked up by the collar 27 secured to the piston, to compress the spring from this end. It will be apparent, therefore, that when the piston is moved either to the right or left from its central position, as shown in Fig. 1, the spring will be compressed so as to return the piston to its original position. The return of the spring is limited by the sleeve 28 on the cylinder head which engages the thimble 23, and by the plate 29 on the end of the spring housing which limits the outward movement of the plate 26.

The piston may be moved by means of fluid pressure introduced through the openings or ports 30 and 31. Preferably a vacuum or pressure less than atmospheric will be employed for this purpose, it being understood that, when that portion of the cylinder at one side of the piston is placed in communication with reduced air pressure or a vacuum through one of the ports 30 or 31, air under atmospheric pressure will be permitted to enter the cylinder at the other side of the piston through the other port and the piston will thereupon be operated to move the shifter rods. As the interior construction of the two cylinders and spring housings secured thereto are precisely the same, it is necessary to show and describe in detail only one thereof.

It is advantageous in most instances, and particularly where the shifter rods are designed to shift transmission gears in and out of mesh, to arrange controlling means for the rods such that one cannot be moved unless the adjacent rod is in a given position, usually the neutral position. This result is effected in this instance, as shown particularly in Figs. 3 and 4 of the drawings, by the provision of recesses 35 and 36 provided in the shifter rods, within which are adapted to lie the lower zones of a pair of balls 37 and 38, which serve as detents to releasably hold the shifter rods in the position shown in Fig. 3, wherein the balls cooperate with the recesses. These balls lie in openings 39 and 40 provided in the material of the cover plate 10.

Upon this part of the cover plate is provided a hollow housing 41, providing a chamber 42, which communicates with the openings 39 and 40 so that when the shifter rods are moved and the balls cammed out of the recesses in the rods, they may move upwardly and inwardly so as to project a substantial distance within the chamber 42.

In order, however, that one of the rods will be prevented from being moved until the adjacent rod is in the position shown in Fig. 3, it is necessary to provide means to hold the corresponding ball within the opening in one rod when the other is shifted. To accomplish this result I have mounted in the chamber 42 a rocker 43 pivoted in the housing 41 and in the cover plate 44 of the chamber 42 by means of pins 45 and 46 respectively which project laterally from the rocker and are received in openings in the housing and cover plate. Below its pivot the rocker is provided with a depending lug 47 which may, as shown in Fig. 3, stand in a neutral position out of engagement with either of the balls 37 or 38, but when the rocker is swung about its pivot, its lower end will engage one of the balls, as shown in Fig. 4, and prevent this ball being moved out of the corresponding recess so as to positively hold the corresponding rod against movement.

The relative disposition and size of the rocker, the balls and associated parts is such that, when the rod 11, for example, is moved, the ball 38 will be moved upwardly into the housing 42 to engage the side of the lug 47 and swing the rocker about its pivot so as to move the lug to the position shown wherein its end engages the ball 37, so as to hold the latter in the recess 35 and positively prevent any movement of the rod 12. It will be observed that, if the rod 12 is at this time subjected to pressure tending to move it longitudinally, this will tend to cam the ball 37 from the recess in the rod. This tendency will be resisted by the rocker and the pressure upon the ball will eventually be transmitted to the pivots of the rocker to be borne entirely by these members so that no force will be acting to urge the ball 38 toward the rod 11 and thereby bind this rod so as to oppose its movement.

The rocker 43 is provided adjacent its upper end with bifurcated arms 48 and 49 shown more particularly in Fig. 7. A compression spring 50 is mounted between fingers 51 and 52 formed on a flat segment 53 inserted in a slot 54 in the housing 41. It will be observed that the ends of the bifurcated arms 48 and 49 of the rocker will straddle the fingers 51 and 52 and upon each side of these fingers engage the ends of the spring 50 so as to compress this spring when the rocker is moved to one side or the other, as shown for example in Fig. 4. When the rod 11, for example, has been returned to neutral position and the ball 38 is again seated in the depression 36, the spring 50 will insure the return of the rocker to its inoperative position, as shown in Fig. 3. It will be apparent that the spring 50 is free to be compressed from either end, so that the one spring will effect the return of the rocker arm to its central position regardless of the direction in which it is moved.

In the case of automobile transmissions, and particularly when such transmissions are power operated, it is advantageous to provide means for preventing the shifting of the gears until the clutch has been disengaged. In the use of the present rod shifting mechanism the shifting is ordinarily accomplished by means of operation of a valve lever or button such as shown, for example, in the Craig Patent No. 1,760,347 granted May 27, 1930, which results in the introduction of reduced air pressure into the cylinder 20 through one of the ports and the venting of the other port to the atmosphere. It will be apparent that, when this is done, the vacuum would act to shift the rods and the gears attached thereto, in the case of transmission gearing, immediately that the valve lever was moved regardless of whether or not the clutch had been operated to cut off the source of power or engine from the transmission.

In order to avoid such an occurrence I have provided the cover 10 with a hollow housing 55 within which is slidably mounted a rod 56 having alternate enlarged and reduced portions 57 and 58 thereon. A spring 59 within the housing 55 bears against this rod and tends to urge it toward the left, as shown in Fig. 2, wherein the enlarged portions 57 engage from above balls 60 and 61 so as to keep these balls seated within depressions 62 and 63 in the rods 11 and 12, and prevent movement of these rods. The rod 56 is provided with a threaded end 64 upon which are nuts 65 against which bears the yoke 66 of a bell crank lever 67 which may be operated by the clutch lever or other controlling part of the power mechanism (not shown). It will be understood that when the clutch is thrown out the yoke 66 will be moved against the nuts 65 so as to move the rod 56 against the spring 59 to a position in which the reduced portions 58 of this rod will lie opposite the balls 60 and 61 and permit these balls to be cammed upwardly out of the openings 62 and 63 and permit the rods 11 and 12 to be shifted.

In Fig. 6 of the drawings I have shown three of the recesses 62 and a like number of recesses 63. It will be the usual practice, of course, to provide as many such openings as there are operative positions for the rods.

While the operation of my device will be apparent from the foregoing description, it may be briefly described as follows:

Assuming that the shifter rods 11 and 12 are in neutral position, and it is desired to shift the rod 11 forwardly the operator moves the valve control lever (not shown) to the proper position to place the rear end of the proper cylinder 20 in communication with a source of reduced air pressure. The pressure of atmospheric air in the front end of the cylinder will tend to move the piston rearwardly, which through the yoke 14 will exert pressure on the rod 11 to move it forwardly. This movement, however, will not be permitted due to the fact that the rod will be locked in position by the enlarged portion 57 of the rod 56 and ball 61. As soon, however, as the lever 67 is moved by movement of the clutch lever, the rod 11 will be released and the piston will move rearwardly in the cylinder moving the yoke 14 forwardly and also compressing the spring 22 from the forward end thereof so that it will tend to return the piston to its original position intermediate the ends of the cylinder.

When the rod 11 moves forwardly, the ball 38 will be cammed out of the depression 36 and engaging against the lug 47 will swing the rocker 43 from the position shown in Fig. 3 to the position shown in Fig. 4 wherein the end of the rocker engages the ball 37 and locks the rod 12 against movement.

If now the operator wishes to move the rod 12, the rod 11 must be brought back to neutral position. This, however, does not require any care on the part of the operator who merely actuates the valve lever to open one end of the proper cylinder 20 to reduce air pressure. At this time the other end of this cylinder and both ends of the other cylinder will be vented to the atmosphere and the spring will tend to move rod 11 back to neutral position. Likewise as reduced pressure exists in one end of the cylinder of the rod 12, the piston will be exerting its force to move this rod in the proper direction.

Therefore, at this time, pressure has been exerted upon both of the shifter rods tending to move one to its neutral position and the other toward an operative position. Both of the rods will be locked against movement due to the locking rod 56. However, when this rod is moved to the right, as shown in Fig. 2, both rods will be released as far as this part of the structure is concerned. It is at this time that the rod controlling mechanism shown in Figs. 3 and 4 is particularly advantageous.

It will be understood that at this time both rods are free to move except for this controlling mechanism, but as shown in Fig. 4, the rod 12 will be held against movement by the lug 47 of the rocker which engages the ball 37 and holds it in the depression 35. The rod 11 is, however, free to move and will be moved by the spring 22 back to neutral position. In this position the ball 38 will drop into the depression 36 and permit the spring 50 to move the rocker 43 from the position, shown in Fig. 4, to the neutral position, shown in Fig. 3, wherein the ball 37 will be released and the rod 12 will be moved by the piston in the proper direction.

It will, therefore, be apparent that one of the rods will be retained against movement from neutral position until the other has been returned to neutral position, and it will also be observed that the rod 12, for example, will be retained in its neutral position without the action of any force which tends to oppose the return movement of the rod 11 or bind this rod against movement, although at the same time the locking of one of the rods is controlled by the other in that the one is released when the other is returned to a neutral position.

If, for example, one of the balls 37 or 38 were located between the rods 11 and 12 so that it would be moved out of engagement with one into engagement with the other, when pressure was exerted upon both of the rods simultaneously, as is the case at certain periods of operation of the device, the tendency of the movement of one rod to cam the ball out of the depression and against the other rod would offer resistance to the return movement of the latter and considerably increase the force required to move this rod. As a result larger springs and larger pistons would be necessary to insure unfailing operation of the device.

While I have shown and described a preferred embodiment of my invention, it will be understood that it is not to be limited to all of the details shown, but is capable of modification and variation within the spirit of the invention and within the scope of the appended claims.

What I claim is:

1. In a device of the character described, a housing, a plurality of shifter rods mounted in the housing, detent mechanism to engage said rods intermediate their ends and retain them against movement, and means movable by the movement of one of said rods into position between the detent mechanism and the housing to positively restrain movement of the other rod, whereby a moving force applied to said other rod will be resisted by said housing.

2. In a device of the character described, a housing, a plurality of shifter rods mounted in the housing, detent mechanism to engage said rods intermediate their ends and retain them against movement, and means movable by one of said rods into position to hold said detent mechanism in retaining engagement with the other rod, and means whereby a moving force applied to said second rod will be resisted by said housing.

3. In a device of the character described, a housing, a plurality of shifter rods mounted in said housing, a detent engaging each of said rods, and a retaining member moved by the movement of one of said rods into position between the detent of the other rod and the housing to retain said second-named rod against movement whereby pressure on said detent is transmitted through said member to the housing.

4. In a device of the character described, a housing, a plurality of shifter rods mounted in said housing, a detent engaging each of said rods intermediate its length, and means acting between said detents and the housing to hold them in position to retain the rods against movement, said means being moved into and released from operative position with respect to one rod by the movement of the detent for the other rod.

5. In a device of the character described, a housing, a plurality of shifter rods mounted in said housing, a detent engaging each of said rods, and means acting between said detents to hold them in position to retain the rods against movement, said means comprising a member movably mounted in the housing, and adapted to be moved by the movement of one rod into a position between the housing and the detent of the other rod whereby moving pressure on the last-named rod will be resisted by the housing.

6. In a device of the character described, a housing, a plurality of shifter rods mounted in said housing, a detent engaging each of said rods, and means acting between said detents to hold them in position to retain the rods against movement, said means comprising a member pivoted in the housing and adapted to be moved into and released from operative position with the detent of one rod by movement of the detent for the other rod.

7. In a device of the character described, a housing, a plurality of shifter rods mounted in said housing, a detent engaging each of said rods, and means acting upon said detents to hold them in position to retain the rods against movement, said means comprising a member pivoted in the housing and adapted to be moved into and released from operative position with the detent of one rod by movement of the other rod, and a spring to return said member to inoperative position when released.

8. In a device of the character described, a housing, a plurality of shifter rods mounted in said housing, a detent engaging each of said rods, and means acting upon said detents to hold them in position to retain the rods against movement, said means comprising a member pivoted in the housing and adapted to be moved into and released from operative position with the detent of one rod by movement of the other rod, and a spring operative to return said member to neutral position when moved in either direction about its pivot.

9. In a shifter rod controlling device, a housing, a plurality of movable rods mounted therein, a ball detent in engagement with each of said rods, a retaining member pivoted on the housing and adapted to be swung into engagement with either of said detents, said detents being adapted to be moved toward said retaining member by the movements of the respective rods, and a single spring engaging said retaining member to return it to neutral position after being engaged with either detent.

10. In a shifter rod controlling device, a housing, a plurality of rods movably mounted therein, a ball detent in engagement with each of said rods, a rocker pivotally mounted in said housing and having a portion at one side of its pivot lying between said balls, said rocker being adapted to be moved into engagement with one of said balls when the other thereof is moved by movement of the respective rod, said rocker being provided with spaced arms upon the other side of the pivot thereof, and a spring mounted in the housing and acting against said arms to urge said rocker toward neutral position when the rocker is moved in either direction.

11. In a shifter rod controlling device, a housing, a plurality of rods movably mounted therein, a ball detent in engagement with each of said rods, a rocker pivotally mounted in said housing and having a portion at one side of its pivot lying between said balls, said rocker being adapted to be moved into engagement with one of said balls when the other thereof is moved by movement of the respective rod, and resilient means acting upon said rocker to return it to neutral position regardless of the direction in which it is moved.

12. In a shifter rod controlling device, a housing, a plurality of rods mounted therein, a detent releasably engaging each of said rods, a rocker pivotally mounted in the housing and having a portion at one side of its pivot lying between said detents, said rocker being adapted to be moved into engagement with one of the detents when the other is moved by movement of the respective rod, and spring means to return said rocker to its normal position between said detents.

In witness whereof, I have hereunto set my hand this 17th day of March, 1931.

ALBERT A. HODGKINS.